US009628591B2

(12) United States Patent
Dharmavaram et al.

(10) Patent No.: US 9,628,591 B2
(45) Date of Patent: Apr. 18, 2017

(54) PACKET TRANSPORT PROTOCOL PROCESSING

(71) Applicant: Oracle International Corporation, Redwood Shores, CA (US)

(72) Inventors: Snigdha Vinjamur Dharmavaram, San Jose, CA (US); Chun Yu Tsui, Foster City, CA (US); Suman Guha, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 126 days.

(21) Appl. No.: 14/730,055

(22) Filed: Jun. 3, 2015

(65) Prior Publication Data

US 2016/0094690 A1    Mar. 31, 2016

Related U.S. Application Data

(60) Provisional application No. 62/056,024, filed on Sep. 26, 2014.

(51) Int. Cl.
*H04L 29/08* (2006.01)
*H04L 29/06* (2006.01)
*H04L 12/721* (2013.01)

(52) U.S. Cl.
CPC ............ *H04L 69/326* (2013.01); *H04L 45/34* (2013.01); *H04L 67/325* (2013.01); *H04L 69/03* (2013.01); *H04L 69/18* (2013.01)

(58) Field of Classification Search
None
See application file for complete search history.

(56) References Cited

U.S. PATENT DOCUMENTS

| 2014/0067665 | A1* | 3/2014 | Paletz | G07B 17/00435 705/40 |
| 2015/0052023 | A1* | 2/2015 | Apsley | G06Q 30/0635 705/26.81 |
| 2015/0242456 | A1* | 8/2015 | Cannon | G06Q 10/101 707/608 |
| 2016/0180274 | A1* | 6/2016 | Zwakhals | G06Q 10/06315 705/7.25 |

* cited by examiner

*Primary Examiner* — Christine Duong
(74) *Attorney, Agent, or Firm* — Kilpatrick Townsend & Stockton LLP

(57) ABSTRACT

A method of implementing a packet transport protocol between a source and a receiver may include receiving input from a source system including data fields indicating whether the source system will allow packet transport to be handled by the receiver. The method may also include receiving input indicating that a packet from the source is required by the receiver. The input can include a first timing requirement indicating at time when the packet is required at the receiver, and a selection between first and second protocols that mandate, respectively, that packet transport is handled by the receiver in the first protocol and by the source in the second protocol. The method may also include determining, based on the data fields, whether the source will allow use of the selected protocol. The method may also include transmitting a request for the packet, in which the request includes a second timing requirement.

20 Claims, 17 Drawing Sheets

Configure Procurement Function

General

| | | | |
|---|---|---|---|
| Payment Terms | ▶ | Inventory Organization | ▶ |
| Shipping Method | ▶ | Line Type | ▶ |
| Freight Terms | ▶ | Currency | ▶ |
| FOB | ▶ | Conversion Rate Type | Corporate ▶ |
| ☐ Receiver-Managed Transport? — 502 | | Preferred Language | ▶ |
| Price Break Type | Cumulative ▶ | Supplier Registration URL | http://www.oracle.com/ISP/reg/BU1027 |
| Buyer | ▶ | | |

Purchasing

| | | | |
|---|---|---|---|
| Max File Size (MB) | 0 ▶ | ☑ Group Requisitions | |
| Next Agreement No. | 1 ▶ | ☑ Use Sales Order Number | |
| Allow Retroactive Pricing | Open Orders Only ▶ | ☑ Group Requisition Lines — 504 | |
| Receipt Close Tol. % | 0 ▶ | ☐ Use Requested Date | |
| Receipt Close Point | Received ▶ | ☐ Use Ship-to Organization and Location — 506 | |
| Invoice Close Tol. % | 0 ▶ | ☑ Default Promised Date From Requested Date | |
| Match Approval Level | 3-Way ▶ | ☑ Allow Item Description Update | |
| | | ☑ Enforce Supplier Hold | |

Edit Document (Purchase Order): 8491

[ Manage Approvals ] [ View PDF ] [ Actions ] | [ Save ] [ Submit ] [ Cancel ]

General

| | | | | |
|---|---|---|---|---|
| Procurement BU: | Vision Operations | Supplier: | Office Supplies | |
| Requisitioning BU: | Vision Operations | Supplier Site: | San Mateo | Currency: USD USD |
| Sold-to Entity: | 8560 | Supplier Contact: | Lifeson, Alex | Ordered: 1,900 |
| Supplier Site: | Vision Ops | Communication Method: | Print | Total Tax: 300.00 USD |
| Order: | 8491 | Bill-to Location: | V1 – New York | Description: iP Computer System 2014 |
| Status: | Incomplete | Ship-to Location: | V1 – New York | |
| Buyer: | Lee, Geddy | | | Requisition: 14887 |
| Creation Date: | Nov 1, 2014 | | | Source Agreement: 14402 |

Terms

| | | | | |
|---|---|---|---|---|
| Req. Ack.: | None | Shipping Method: | FedEx-Parcel-Express | ☑ Pay on Receipt |
| Ack. Within (Days): | 5 | Freight Terms: | Paid | ☑ Confirming Order |
| Payment Terms: | 30 Net (Terms date + 30) | FOB: | Origin | |
| | | ☐ Receiver-Managed Transport — 702 | | |

Lines

| Description | Category Name | Ordered | Price | Location | Req Delivery Date | Promised Delivery Date |
|---|---|---|---|---|---|---|
| HP i4700 Color Photo... | Computer Supplies | 1,500.00 | 150 | V1-New York | Dec 3, 2014 | Dec 3, 2014 |
| Silver Strategy Consu... | Consulting Services | 400.00 | 400 | V1-New York | Dec 18, 2014 | Dec 18, 2014 |

Acknowledge Document (Purchase Order): 8491  [View PDF] [Accept] [Reject] [Cancel]  — 800

General

| | | | |
|---|---|---|---|
| Sold-to Entity: Vision Operations | Supplier: Office Supplies | | Ordered: 1,900.00 USD |
| Order: 8491 | Supplier Site: San Mateo | | Source Doc: Multiple |
| Status: Pending Supp. Ack. | Supplier Contact: Alex Lifeson | | Description: IP Computer System 2014 |
| Buyer: Lee, Geddy | Bill-to Location: V1-New York | | |
| Creation Date: Nov 1, 2014 | Ship-to Location: V1-New York | | |
| Supplier Order: | | | |

Terms

Req. Ack.: Document
Ack. Due Date: Nov 6, 2014
Ack. Note:

Payment Terms: 30 net (terms date+30)
Shipping Method: Federal Express
FOB: Origin
Freight Terms: Paid ☐ Receiver-Managed Transport — 806

☑ Pay on Receipt
☑ Confirming Order

— 808

Lines

| Description | Category Name | Ordered | Price | Location | Req Delivery Date | Promised Delivery Date |
|---|---|---|---|---|---|---|
| HP 14700 Color Photo... | Computer Supplies | 1,500.00 | 150 | V1-New York | Dec 3, 2014 | Dec 3, 2014 |
| Silver Strategy Consu... | Consulting Services | 400.00 | 400 | V1-New York | Dec 18, 2014 | Dec 18, 2014 |

Edit Document (Purchase Order): 8491 — 900

Manage Approvals | View PDF | Actions | Save | Submit | Cancel

General

| Procurement BU: | Vision Operations | Supplier: | Office Supplies |
| Requisitioning BU: | Vision Operations | Supplier Site: | San Mateo |
| Sold-to Entity: | 8560 | Supplier Contact: | Lifeson, Alex |
| Supplier Site: | Vision Ops | Communication Method: | Print |
| Order: | 8491 | Bill-to Location: | V1 – New York |
| Status: | Incomplete | Ship-to Location: | V1 – New York |
| Buyer: | Lee, Geddy | | |
| Creation Date: | Nov 1, 2014 | | |

| Currency: | USD |
| Ordered: | 1,900 USD |
| Total Tax: | 300.00 USD |
| Description: | iP Computer System 2014 |
| Requisition: | 14887 |
| Source Agreement: | 14402 |

Terms

| Req. Ack.: | None | Shipping Method: | FedEx-Parcel-Express |
| Ack. Within (Days): | 5 | Freight Terms: | Paid |
| Payment Terms: | 30 Net (Terms date + 30) | FOB: | Origin |

☑ Receiver-Managed Transport — 902

☑ Pay on Receipt
☑ Confirming Order

Lines

904

| Description | Category Name | Ordered | Price | Location | Req Ship Date | Promised Ship Date |
|---|---|---|---|---|---|---|
| HP i4700 Color Photo... | Computer Supplies | 1,500.00 | 150 | V1-New York | Nov 29, 2014 | Nov 29, 2014 |
| Silver Strategy Consu... | Consulting Services | 400.00 | 400 | V1-New York | Dec 1, 2014 | Dec 1, 2014 |

FIG. 9

Acknowledge Document (Purchase Order): 8491 — 1000

[View PDF] [Accept] [Reject] [Cancel]

General

| | | |
|---|---|---|
| Sold-to Entity: Vision Operations | Supplier: Office Supplies | Ordered: 1,900.00 USD |
| Order: 8491 | Supplier Site: San Mateo | Source Doc: Multiple |
| Status: Pending Supp. Ack. | Supplier Contact: Alex Lifeson | Description: IP Computer System 2014 |
| Buyer: Lee, Geddy | Bill-to Location: V1-New York | |
| Creation Date: Nov 1, 2014 | Ship-to Location: V1-New York | |
| Supplier Order: | | |

Terms

| | |
|---|---|
| Req. Ack.: Document | Payment Terms: 30 net (terms date+30) |
| Ack. Due Date: Nov 6, 2014 | Shipping Method: Federal Express |
| Ack. Note: | FOB: Origin |
| | Freight Terms: Paid ☑ Receiver Managed Transport — 1006 |
| | ☑ Pay on Receipt |
| | ☑ Confirming Order |

1008

Lines

| Description | Category Name | Ordered | Price | Location | Req Ship Date | Promised Ship Date |
|---|---|---|---|---|---|---|
| HP i4700 Color Photo... | Computer Supplies | 1,500.00 | 150 | V1-New York | Nov 29, 2014 | Nov 29, 2014 |
| Silver Strategy Consu... | Consulting Services | 400.00 | 400 | V1-New York | Dec 1, 2014 | Dec 1, 2014 |

FIG. 10

| Order Document | | | | | | |
|---|---|---|---|---|---|---|
| Line | Item | Price | Quantity | UOM | Ordered | Taxable |
| 1 | desc-DIT<br>CM13139 | 150.393 | | Each | | |
| | | | | Each | 1,503.93 | ☑ |
| | Ship To | Promised<br>6/1/15 | | | | |
| | | Requested<br>6/1/15 | 10 | | | |

*\*Requested and Promised dates indicate the date of arrival at the delivery dock of the ship-to location* — 1202a 1200a

FIG. 12A

| Order Document | | | | | | | |
|---|---|---|---|---|---|---|---|
| Line | Item | | Price | Quantity | UOM | Ordered | Taxable |
| 1 | desc-DIT<br>CM13139 | | 150.393 | | Each | | |
| | Ship To | Promised<br>5/25/15 | | 10 | Each | 1,503.93 | ☑ |
| | | Requested<br>5/20/15 | | | | | |

*\*\*Requested and Promised dates indicate the date of arrival at your shipping dock for pick up for transportation managed by the buyer* — 1202b 1200b

FIG. 12B

Supplier Scorecard

★★★☆☆ *Time run: 08/11/2014 21:24*

| Supplier Name | Supplier Score | Accepted % | Received On Time % | Received Late % | Received Early % | # of PO |
|---|---|---|---|---|---|---|
| ACME Net Devices | ★★★★★ | 100% | 100% | 0% | 27% | 39 |
| Cygnus Routers | ★★★★☆ | 100% | 82% | 18% | 55% | 62 |
| Lifeson Acoustics | ★★★☆☆ | 90% | 49% | 51% | 2% | 155 |
| Peart Book Binding | ★★☆☆☆ | 82% | 22% | 78% | 11% | 278 |

PACKET TRANSPORT PROTOCOL PROCESSING

CROSS-REFERENCES TO RELATED APPLICATIONS

This application claims benefit to Provisional Application No. 62/056,024, filed Sep. 26, 2014, entitled "SHIPPING AND RECEIVING SYSTEM", which is fully incorporated by reference herein.

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

SUMMARY

In some embodiments, a method of implementing a packet transport protocol for packet transport between a source and a receiver may be presented. The method may include receiving, through a web interface at a receiving system, input from a source system. The input may include data fields indicating whether the source system will allow packet transport to be governed by protocols where the packet transport is handled by the receiver. The method may also include receiving, at the receiving system, input indicating that a packet from the source is required by the receiver. The input may include a first timing requirement indicating a time when the packet is required at the receiver, and a selection of a protocol, the protocol being selected from a group of protocols. The group of protocols may include a first protocol where packet transport is handled by the receiver, and a second protocol where packet transport is handled by the source. The method may additionally include determining, at the receiving system, whether the source will allow the protocol based on the data fields from the source system; and transmitting, from the receiving system to the source system, a request for the packet, the request comprising a second timing requirement for the source. If the first protocol is selected, the second timing requirement may indicate the time at which the packet should be made available at the source such that the packet arrives at the receiver at or before a time indicated by the first timing requirement. If the second protocol is selected, the second timing requirement may be the same as the first timing requirement such that the packet arrives at the receiver at or before the time indicated by the first timing requirement.

In some embodiments, a non-transitory, computer-readable medium may be presented. The medium may include instructions which, when executed by one or more processors, cause the one or more processors to perform operations including receiving, through a web interface at a receiving system, input from a source system. The input may include data fields indicating whether the source system will allow packet transport to be governed by protocols where the packet transport is handled by the receiver. The operations may also include receiving, at the receiving system, input indicating that a packet from the source is required by the receiver. The input may include a first timing requirement indicating a time when the packet is required at the receiver, and a selection of a protocol, the protocol being selected from a group of protocols. The group of protocols may include a first protocol where packet transport is handled by the receiver, and a second protocol where packet transport is handled by the source. The operations may additionally include determining, at the receiving system, whether the source will allow the protocol based on the data fields from the source system; and transmitting, from the receiving system to the source system, a request for the packet, the request comprising a second timing requirement for the source. If the first protocol is selected, the second timing requirement may indicate the time at which the packet should be made available at the source such that the packet arrives at the receiver at or before the time indicated by the first timing requirement. If the second protocol is selected, the second timing requirement may be the same as the first timing requirement such that the packet arrives at the receiver at or before the time indicated by the first timing requirement.

In some embodiments, a system may be presented. The system may include one or more processors and one or more memory devices including instructions which, when executed by the one or more processors, cause the one or more processors to perform operations including receiving, through a web interface at a receiving system, input from a source system. The input may include data fields indicating whether the source system will allow packet transport to be governed by protocols where the packet transport is handled by the receiver. The operations may also include receiving, at the receiving system, input indicating that a packet from the source is required by the receiver. The input may include a first timing requirement indicating a time when the packet is required at the receiver, and a selection of a protocol, the protocol being selected from a group of protocols. The group of protocols may include a first protocol where packet transport is handled by the receiver, and a second protocol where packet transport is handled by the source. The operations may additionally include determining, at the receiving system, whether the source will allow the protocol based on the data fields from the source system; and transmitting, from the receiving system to the source system, a request for the packet, the request comprising a second timing requirement for the source. If the first protocol is selected, the second timing requirement may indicate the time at which the packet should be made available at the source such that the packet arrives at the receiver at or before the time indicated by the first timing requirement. If the second protocol is selected, the second timing requirement may be the same as the first timing requirement such that the packet arrives at the receiver at or before the time indicated by the first timing requirement.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5 illustrates an interface for configuring packet transport protocol options, according to some embodiments.

FIG. 7 illustrates an interface for selecting packet transport protocols managed by the source, according to some embodiments.

FIG. 8 illustrates an interface for acknowledging packet transport protocols managed by the receiver, according to some embodiments.

FIG. 9 illustrates an interface for selecting packet transport protocols managed by the receiver, according to some embodiments.

FIG. 10 illustrates an interface for acknowledging packet transport protocols managed by the receiver, according to some embodiments.

FIG. 12A illustrates, a sample document that may be transmitted to the source when packet transport is managed by the source, according to some embodiments.

FIG. 12B illustrates a sample document that may be transmitted to the source when the packet transport is managed by the receiver, according to some embodiments.

FIG. 13 illustrates an interface for scoring sources based on meeting timing requirements for packet transport, according to some embodiments.

DETAILED DESCRIPTION

The methods and systems described herein select between and manage various packet transport protocols governing communications between a source and receiver. Packet transport between a source and receiver may include a timing requirement that specifies when packet transport begins or ends. Prior to this disclosure, transmitting timing requirements between the receiver and the source included a level of ambiguity such that the source could not be certain whether the timing requirement indicated a time when the packet had to leave the source or a time when the packet had to arrive at the receiver. Because of this ambiguity, timing requirements were often violated, which affected scores generated by analytics engines for ranking various sources of packets. Thus, a misinterpretation of the timing requirement could result in a source receiving a lower score from the analytics engine and thereby forcing the receiver to erroneously assume that the source was unreliable. The methods and systems described herein provide algorithms for selecting the proper packet transport protocol and for establishing timing requirements that are unambiguously transmitted between the source and receiver.

In some embodiments, a receiving system can select between (or receive a selection between) at least two different packet transport protocols (also referred to simply as "protocols"). For example, a first protocol may be selected where packet transport is handled by the receiver. Alternatively or additionally, a second protocol may be selected where packet transport is handled by the source. Along with the selected protocol, a timing requirement may also be generated by the receiver. Based on the protocol, the timing requirement may be translated into a second timing requirement such that the source knows where/when the packet needs to be transmitted. The second timing requirement can then be sent to the analytics engine so that the source is properly scored when the packet arrives.

Figure 1:
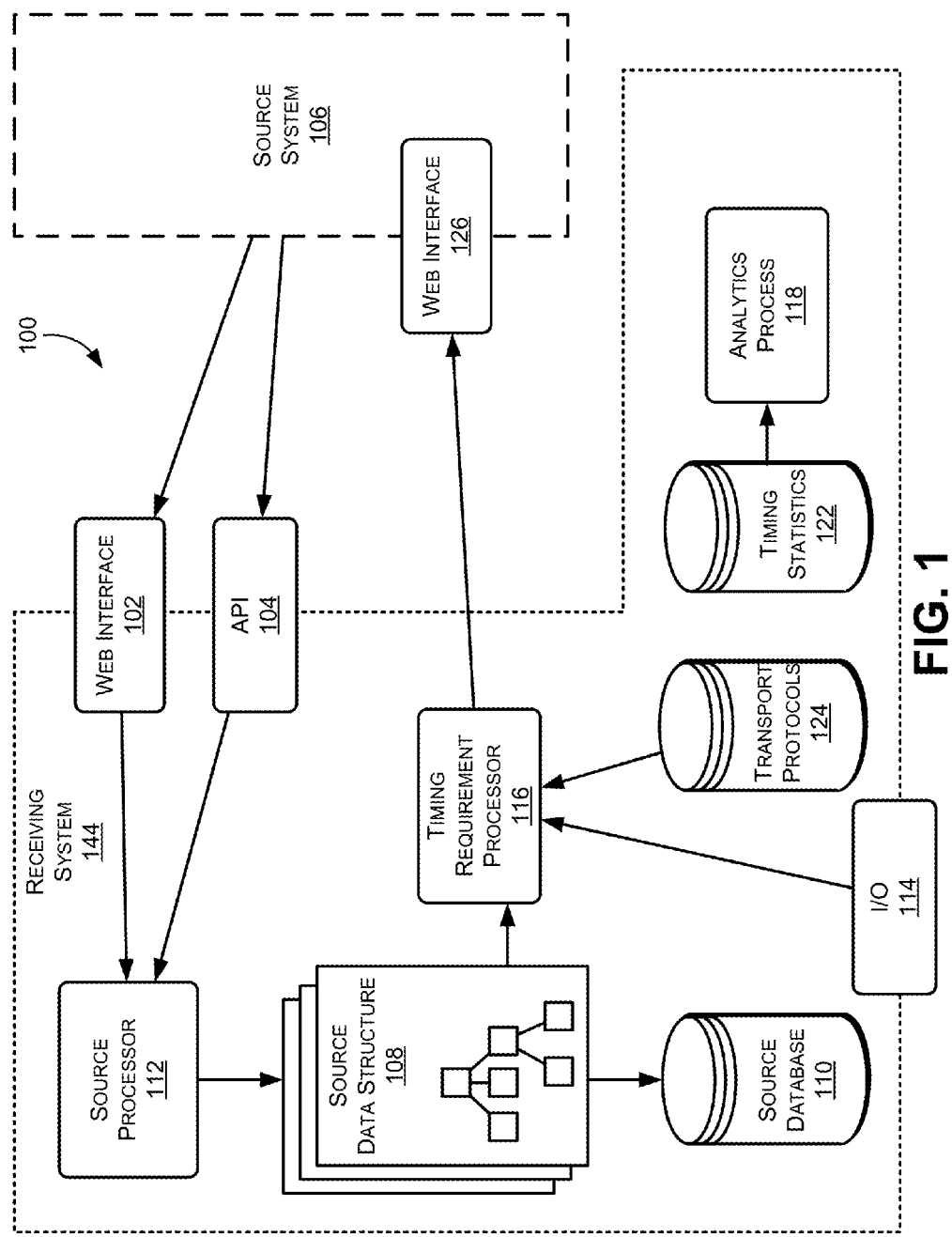
FIG. 1 illustrates a block diagram of a system for packet transport protocol processing, according to some embodiments.

FIG. 1 illustrates a block diagram 100 of a system for packet transport protocol processing, according to some embodiments. A source system 106 may be associated with a packet source, referred to simply as a "source." The source system can communicate with a receiving system 144 that is associated with a packet receiver, referred to simply as a "receiver." Communication between the source system 106 and the receiving system 144 may take place through a standardized web interface 102 configured to receive information in a structured format. Alternatively or additionally, such communication may also be facilitated through an application programming interface (API) 104 that is publicly provided by the receiving system 144. The source system 106 can provide standard information that can be used to select between various packet transport protocols, such as sourcing locations for the packet, supported protocols, timing requirement windows, and so forth. In some embodiments, an existing receiving system 104 be modified to receive an indication from the source system 106 that specifies whether the source will allow packet transport protocols where packet transport is managed by the receiver.

A source processor 112 at the receiving system 144 can receive the information from the source system 106, validate the received information, and store information in a source data structure 108. The source data structure 108 can be one of many source data structures stored in a source database 110 that includes source data structures for various available packet sources. The source data structure 108 can include information that the receiving system 144 would need to initiate a packet transport request from the source system 106. An exemplary source data structure 108 is further illustrated below in reference to FIG. 3.

The receiving system 144 may include an I/O port 114 that can receive indications that a packet from the source is required by the receiver. Such an indication may include a selection of a packet transport protocol and/or a timing requirement for the packet. In some embodiments, the selected packet transport protocol may be selected from a plurality of transport protocols stored in a transport protocol database 124. As described below, the transport protocol database 124, the source database 110, and other databases in the receiving system 144 may be implemented using various cloud-based database systems such as those made commercially available by Oracle®.

A timing requirement processor 116 can receive the indication that a packet is required from the I/O port 114 and retrieve specifications for the selected transport protocol from the transport protocol database 124. The timing requirement processor 116 can generate a timing requirement for the source system 106 based on the selected packet transport protocol and the received timing requirement from the I/O port 114. As will be described below, the timing requirement may be a copy of the received timing requirement for cases where the packet transport protocol specifies packet transport managed by the source. In cases where the packet transport protocol specifies packet transport managed by the receiver, the timing requirement processor 116 can compute a new timing requirement that specifies when the packet is to be made available at the source such that the packet will reach the receiver within the original (first) timing requirement received from the I/O port 114. It should be noted that in some embodiments, the indication that the packet is required by the receiver need not come specifically from the I/O port 114, but may instead be generated automatically by another computer system interfacing with the receiving system 114. For example, this indication may be generated by a procurement system that generates regular packet request according to a procurement schedule.

The timing requirement processor 116 can generate and transmit a formal request for the packet delivered to the source system 106 through a web interface 126. Some embodiments may also include different or additional communications sent between the receiving system 114 and the source system 106 when requesting a packet, such as a PDF/XML file that includes details of the packet request. The source system 106 can receive the packet request, which will include an unambiguous timing requirement and clearly indicate whether packet transport should be handled by the source or the receiver. The source can then either make the packet available at the source or manage transport of the packet to the receiver based on the timing requirement and selected packet transport protocol.

After the packet is received by the receiver, the receiving system 104 can receive an indication of when the packet arrived at the receiver. In some embodiments, a timestamp can be generated based on a clock at the receiver. Additionally or alternatively, a delivery time can be received with the packet at the receiver from a system transporting the packet. The arrival time can then be provided to an analytics process 118 (also referred to as an analytics engine). The analytics process 118 can store the arrival time in a timing statistics database 122 such that the arrival time is associated with the source. The analytics process 118 may also generate additional information based on the arrival time that scores the source according to how closely the packet transport protocol and timing requirement were adhered to by the source.

In the feedback loop, the analytics process 118 can provide input to the timing requirement processor 116. The timing requirement processor 116 can then choose sources for packet requests in the future based on the generated score. For example, many packet requests may be received by the timing requirement processor 116 without specifying the source, or specifying a number of different possible sources. The timing requirement processor 116 may select from among a plurality of available sources based on scores generated by the analytics process 118. The timing requirement processor 116 may also select between available sources based on the selected packet transport protocol. For example, a first source may have a better track record of meeting timing requirements for a first transport protocol where packet transport is handled by the receiver, and a second source may have a better track record of meeting timing requirements for a second transport protocol where packet transport is handled by the source. The timing requirement processor 116 can therefore select between available packet sources based on past scores that are specific to a selected packet transport protocol.

Figure 2:
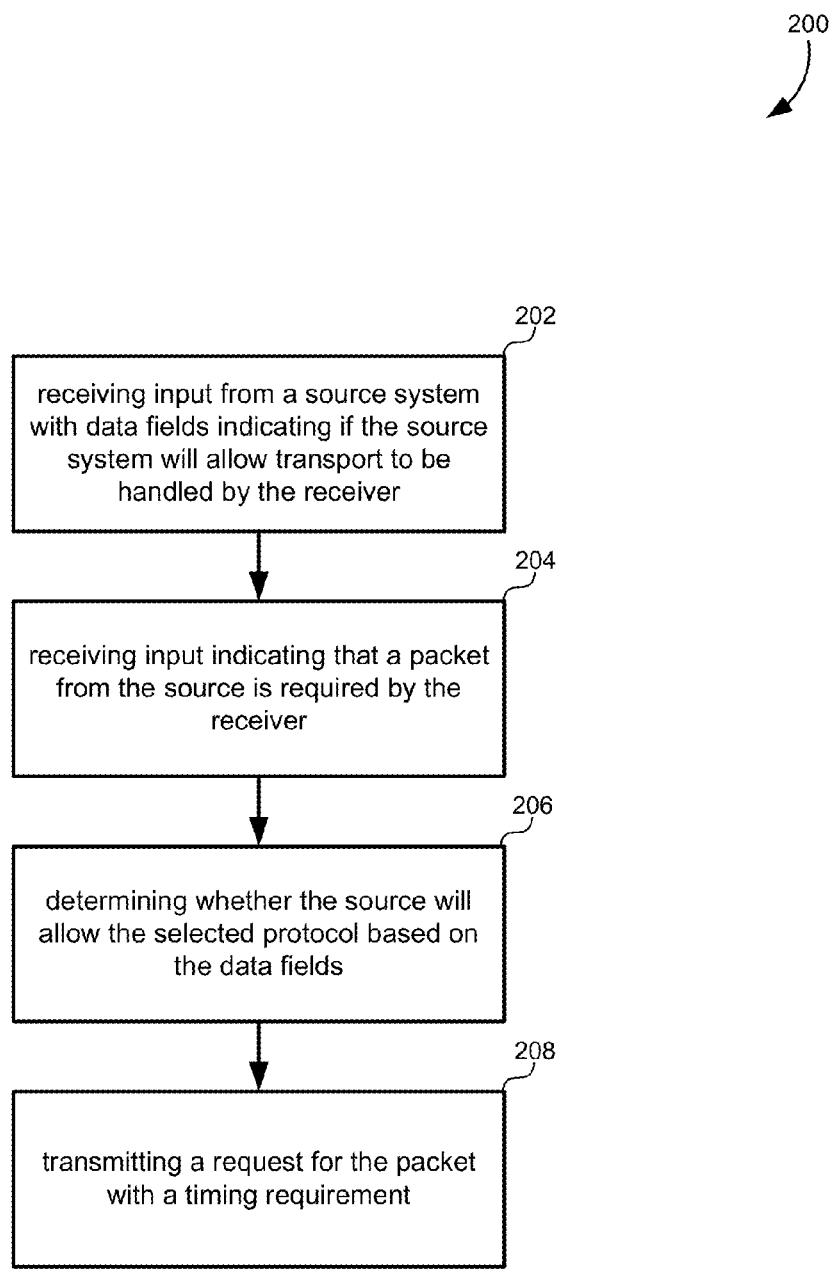
FIG. 2 illustrates a flowchart of a method for packet transport protocol processing, according to some embodiments.

FIG. 2 illustrates a flowchart 200 of a method for packet transport protocol processing, according to some embodiments. The method may include receiving input from a source system with data fields indicating whether the source system will allow transport to be handled by the receiver (202). This step may be part of a registration operation in which the source registers through a web interface with the receiver, specifying the source's preferences for packet transport. The web interface may include a web service, an API, and/or any other means for receiving structured or unstructured data. In some embodiments, the web interface may include a web form that includes data fields where values are provided by the receiving system. In some embodiments, the web interface may receive structured data in the form of a particular data structure as described below in relation to FIG. 3. In some embodiments, the method may also include locating a data structure for the source if the data structure already exists, or generating the data structure for the source if the data structure does not already exist. The data structure can store an organizational hierarchy of the source as described below. The data structure can store data fields received from the source through the web interface. The data structure can be subsequently accessed when determining whether the source will allow the selected protocol based on the data fields received from the source during the registration operation.

The method may also include receiving input indicating that a packet from the source is required by the receiver (204). In some embodiments, the input may include a first timing requirement and the selection of a protocol. The first timing requirement may indicate a time when the packet is required at the receiver. The selected protocol may be selected from a group of protocols that includes a first protocol and a second protocol. The first protocol may indicate that packet transport is handled by the receiver, while the second protocol may indicate that packet transport is handled by the source. In some embodiments, the timing requirement may instead indicate the time when the packet is required at the source. In some embodiments, the first timing requirement and/or the selection of the protocol do not need to be received as part of the indication that the packet is required at the receiver. Instead, the system can automatically select a protocol and/or a timing requirement based on the stored data structure of the selected source and/or the scores from the analytics process.

The method may additionally include determining whether the source will allow the selected protocol based on the data fields (206). By way of example, some sources do not allow packet transport to be managed by the receiver, or at least do not allow the receiver to score packet transport results when the receiver manages packet transport. Thus, if a packet transport protocol is selected that requires management of packet transport by the receiver, and if such a packet transport protocol is not allowed by the source, then the system may automatically select a packet transport protocol that is managed by the source instead. The data structure for the source may be accessed during this step, and the data fields may be retrieved to make this determination on a source-specific basis. For example, some data structures may include a specific field, such as a flag, that indicates whether the source allows packet transport protocols in which packet transport is managed by the receiver. This flag can be accessed and used to select a new packet transport protocol at the receiving system.

The method may further include transmitting a request for the packet with the timing requirement (208). In some embodiments, if the first protocol is selected, then the second time requirement indicates the time at which the packet must be made available at the source such that the packet arrives at the receiver at or before the first timing requirement. Also, if the second protocol is selected, the second time requirement is the same as the first timing requirement such that the packet arrives at the receiver at or before the time indicated by the first time requirement. The second timing requirement may be computed based on the first timing requirement and the selected packet transport protocol. The request for the packet transmitted to the source may include an indication of the first protocol if the first protocol is the selected protocol and if the source will allow the second protocol (a determination which can be made based on the value of the data field). Alternatively, the request for the packet may include an indication of the second protocol if the second protocol is selected or if the source will not allow the second protocol (again, a determination which can be made based on the values of the data fields). In this way, the selected protocol and the second timing requirement can be unambiguously communicated to the source such that the source knows when the packet must be made available and where.

In some embodiments, the second timing requirement can be sent to the analytics process. The analytics process may also receive a time that indicates when the packet is received by the receiver. The analytics process can then score the source relative to other sources based on a comparison between the second timing requirement and the time the packet is received by the receiver.

Figure 3:
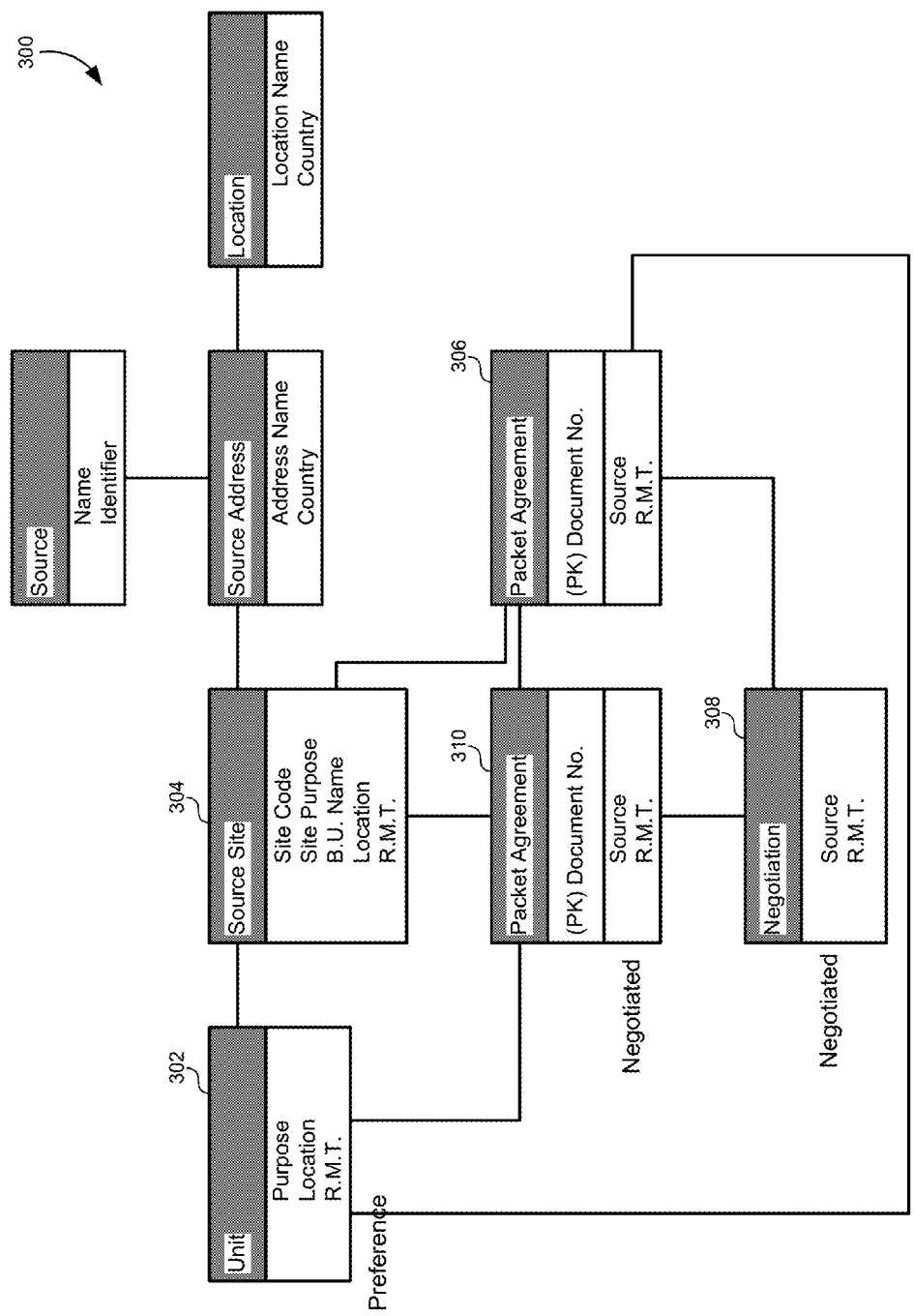
FIG. 3 illustrates a block diagram of a data structure for storing source information, according to some embodiments.

FIG. 3 illustrates a block diagram 300 of a data structure for storing source information, according to some embodiments. The data structure can represent an organizational hierarchy of the source. Such an organizational hierarchy can include names, identifiers, Internet Protocol (IP) addresses, physical addresses, locations, countries, site codes, document numbers, and so forth. In some of the embodiments described herein, the data structure can include different locations from which a packet may be sourced. Each source site 304 may include information needed to request a packet from that site. Each source site 304 may also include a field specifying whether that particular source location can facilitate packet transport protocols under conditions in which packet transport is managed by the receiver. As used herein, this facilitation may be referred to as receiver-managed transport (RMT). By storing RMT values for each packet source location, the receiving system can select from among various locations based on the selected protocol. For example, the receiving system can select a first packet source location if RMT is specified, or a second packet source location if RMT is not specified, based on the data structure information stored for each source site 304.

The source may may be organized into multiple source units that are divided into functional units, organizational units, and/or business units. The data structure may include a node for each source unit 302. In addition to specifying which source site should be used to source the packet, the request for the packet may be associated with a specific source unit. For example, a first category of packet types may be associated with a first source unit of the source, while a second category of packet types may be associated with a second source unit of the source. Each source unit may also have requirements that either allow or disallow RMT. Therefore, in some embodiments, the receiving system may first determine a source unit 302 and/or a source site 304 to determine whether RMT is preferred, allowed, and/or disallowed.

Each packet transfer protocol may be subject to a negotiated packet transport protocol field 308 that is negotiated between the source and the receiver. This data field may broadly be used to determine whether RMT is allowed or disallowed for the entire source. For each instantiation of a packet transport protocol, a specific packet agreement 306, 310 can be generated that is based on the negotiated packet transport protocol field 308, the specified source unit 302, and/or the specified source site 304. Thus, three levels within the source hierarchy stored by the data structure can influence whether BMT is allowed or disallowed based on the circumstances of each particular packet request. The receiving system may determine a type of packet being requested, then determine the best source site 304 and/or source unit 302 subject to the overall negotiated packet transport protocol field 308 to either approve a selected transport protocol or select a new transport protocol.

Each embodiment described herein may incorporate a packet request, a timing requirement, and a transport protocol that specifies responsibility for packet transport between a source and receiver. As used herein, the term "receiver" may broadly refer to any system or entity that is receiving a packet. Similarly, the term "source" may broadly refer to any system or entity that is providing a packet that is received by a receiver. The terms "receiving system" and "source system" may refer to specific computer systems associated with the receiver and source respectively. The term "packet transport" may include any means, electronic or otherwise, for moving a packet between the source and the receiver. The terms "packet transport protocol", "transport protocol", or simply "protocol" may describe any set of specifications that govern how packet transport should be accomplished. The discussion above related to selecting between various transport protocols and specifying/translating timing requirements based on whether packet transport will be managed by the source of the receiver can apply broadly to many different situations.

In some embodiments, the term "packet" may refer specifically to electronic data packet that is being passed between the receiving system and the source system. Transport protocols may refer to different standards and methods for transporting data packets between two computer systems, such as File Transfer Protocol (FTP), Hypertext Transfer Protocol (HTTP), HTTP Secure (HTTPS), a Virtual Private Network (VPN), Secure FTP (SFTP), e-mail, and so forth. The timing requirement received at the receiving system may indicate when the packet is needed at the receiver. Translating the time requirement into a second timing requirement may involve subtracting the measured packet latency between the source and the receiver such that the second timing requirement indicates when the packet must be transmitted by the source. Some applications of this embodiment may include receiving video, audio, VoIP, etc., through the Internet or a content delivery network in which packet transmission is time sensitive.

Figure 4:
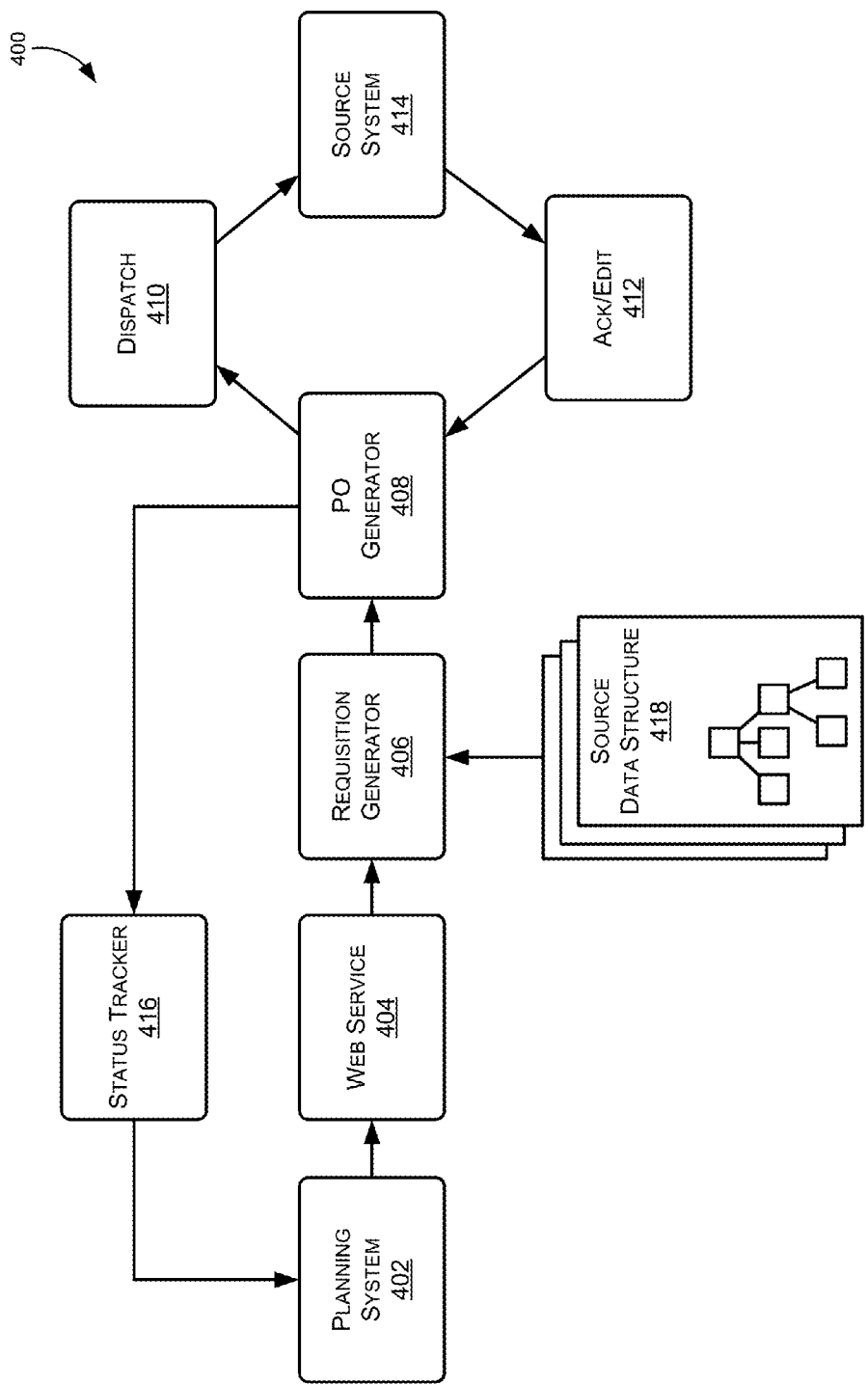
FIG. 4 illustrates a flow diagram of software/hardware modules used for packet transport protocol processing, according to some embodiments.

FIG. 4 illustrates a flow diagram 400 of software/hardware modules used for packet transport protocol processing, according to some embodiments. The system may be particularly useful for embodiments dealing with a physical packet that is shipped between a receiver and a source. A planning system 402 can generate automatic packet requests based on a predetermined schedule. For example, regular shipments of particular packet types (e.g. computer equipment) may be requested by the planning system 402. The planning system 402 can interface through a web service 404 for the receiver to generate a formal internal packet request (e.g. a requisition) at a requisition generator 406. Web service 404 can receive inputs from the planning system 402 as well as specific user terminals and other systems associated with the receiver, such as an invoicing system, a shipping and receiving system, and so forth.

The request received through the web service 404 may include a specification as to whether the source of the receiver should manage transport of the protocol as well as a timing requirement (e.g. when the packet is needed by the entity making a request). In some embodiments, the requisition can be passed to a PO generator 408 to generate a purchase order which can then be sent to a dispatch system 410 to a source system 414. This transmission may include electronic, structured data entered into a web interface of the source system 414. This transmission may also include physical or electronic documents that specify the request for the packet. When RMT is selected such that the receiver will be managing packet transport, the source system 414 may be required to acknowledge the packet request. An interface may be provided such that the source system 414 can acknowledge and/or edit the original request 412, and the PO generator 408 can re-dispatch the packet request to reflect the changes and/or accept the acknowledgment.

The PO generator 408 may also send an indication of the final timing requirements and details of the selected packet transport protocol to a status tracker 416, which may be part of the analytics process described above. The status tracker can watch for an indication that the packet has been received by the receiver and then score the source accordingly.

FIG. 5 illustrates an interface 500 for configuring packet transport protocol options, according to some embodiments. Interface 500 may include many standard data fields that can be used to organize packet requests and transportation between sources and receivers. These data fields may include shipping terms, payment terms, currencies, languages, file sizes, and so forth. The standard data fields may be augmented by some embodiments to include a data field specific to RMT. Field 502 may be used to set a flag that generally determines whether RMT is approved by the source. Field 504 may set a flag that selects between a requested time when the packet is available at the source versus a requested time when the packet is delivered to the receiver. Field 506 may be used to automatically set a "promised" timing requirement based on the "requested" timing requirement. (In some embodiments, a requested time and a promised time will often be the same; however, these times may also differ based on the particular packet request.)

Interface 500 may be generated based on the data fields and datatypes provided in the data structure described above in relation to FIG. 3. Interface 500 may be part of a web form provided by a web service for providing general information for packet transport between a source and a receiver. A source system 500 may be used to populate the data fields of interface 500, which are then transmitted to the receiving system to populate the data structure. This information may be considered general preferences or instruction set by the source that can later be used to select between protocols that allow RMT and protocols that do not.

Figure 6:
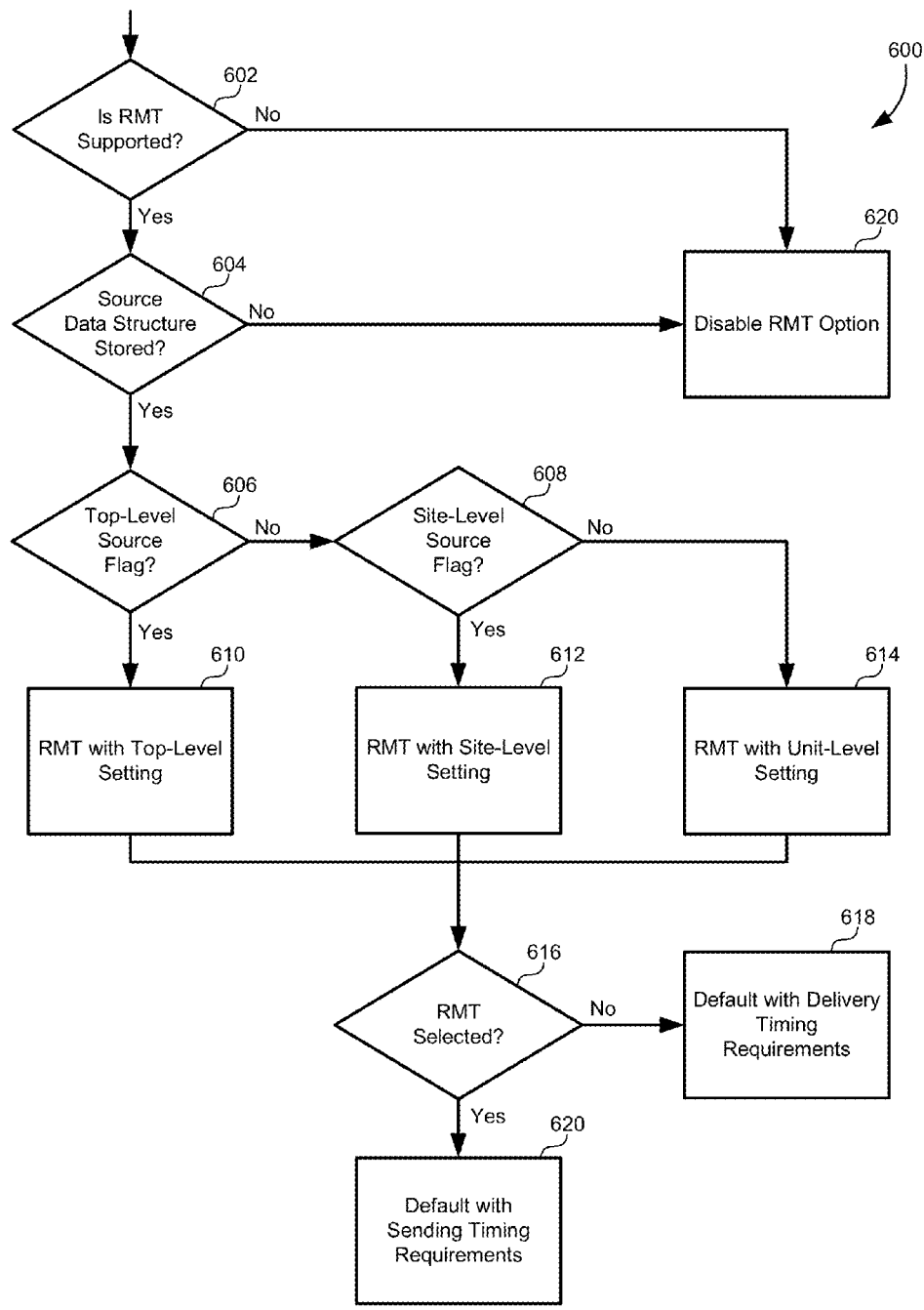
FIG. 6 illustrates a flowchart of a method for selecting between packet transport protocols, according to some embodiments.

FIG. 6 illustrates a flowchart 600 of a method for selecting between packet transport protocols, according to some embodiments. When the receiving system receives a new request for a packet from a source, there are three inquiries that may be satisfied before protocols supporting RMT are selected: has RMT been selected, does the receiver support RMT, and does the source support RMT? This method may include first determining whether the receiver supports transport protocols with RMT (602). Next, the receiving system can determine whether a data structure is stored in the source database corresponding to the selected source (604). If either of these two determinations are negative, then the receiving system can disable the RMT option, such that protocols calling for receiver-managed packet transport are disabled (620). If the source data structure is missing, then this can be interpreted as a situation where the source has not yet provided an input indicating whether it allows the receiver to manage packet transport. Thus, in these embodiments, the receiving system requires a positive preapproval by the source in order to manage its own packet transport.

The method may also include determinations that are specific to a source site, a source unit, and a top-level source. The order in which these determinations are made in FIG. 6 are merely exemplary and not meant to be limiting. Other embodiments may reorder these determinations to reflect different priorities when determining whether RMT is allowed based on the hierarchical organization of the source. In this example, if the top-level, or general, data field for the source retrieved from the source data structure indicates that RMT is supported (606), the method may immediately allow RMT based on this top-level setting (610). If the general data field is not set, then the method can next look at a specific source site from which the packet will be sourced (608). If the site setting allows for RMT, then the method may immediately allow RMT based on the site-level setting (612). Finally, if the site-level data field does not allow RMT, then the method may proceed with the RMT setting at the unit-level according to the data structure (614). Again, this portion of flowchart 600 may be rearranged to give priority to the general setting, the site-level setting, and/or the unit-level setting depending on the needs of the particular source system.

At this point, RMT has either been disabled or allowed by the source data structure settings. The method may next include determining whether RMT is selected for this particular packet transport (616). If not, then packet transport can be initiated using delivery timing requirements and be managed by the source (618). If RMT is selected by the packet request, then packet transport can be initiated using sending timing requirements and be managed by the receiver (620).

FIG. 7 illustrates an interface 700 for selecting packet transport protocols managed by the source, according to some embodiments. As described above, the receiving system may include an I/O port that receives indications that a packet is required by the receiver. Interface 700 illustrates one interface that can be used to provide packet request information to the receiving system for generating a formal packet request from the source (e.g., a purchase order). Most of interface 700 includes standard information that will be part of a packet request. However, in the embodiments described herein, interface 700 can be modified to include a control 702 that allows the packet request to specifically use a packet transport protocol where packet transport is managed by the receiver. In this case, control 702 may be connected with a Boolean data field that is used to process the packet request. Based on the setting of control 702, requisition lines can be generated that include request delivery dates and promised delivery dates displayed by control 704. It should be noted that because RMT is not selected by control 702, the dates displayed by control 704 correspond to timing requirements for the packet to be delivered to the receiver, because packet transport will be managed by the source.

FIG. 8 illustrates an interface 800 for acknowledging packet transport protocols managed by the receiver, according to some embodiments. After generating a formal packet request to be transmitted to the source, certain transport protocols may require that the source provide an explicit acknowledgment for the terms of the packet delivery. One of the terms that may require source acknowledgment is the fact that the receiver has selected a transport protocol where packet transport is managed by the receiver. Indicator 806 of interface 800 used for acknowledging a packet request indicates to the source that RMT is not selected, and thus the timing requirements provided by indicator 808 should be interpreted by the source as times at which the packet must be delivered at the receiver. Interface 800 allows a source to modify the terms of the packet transport agreement, to reject the terms, or to accept the terms. It will be understood that this process of accepting, rejecting, and/or proposing counter terms as part of the packet transport agreement can continue cyclically (as illustrated by FIG. 4) until an agreement is reached between the source system and receiving system.

FIG. 9 illustrates an interface 900 for selecting packet transport protocols managed by the receiver, according to some embodiments. Interface 900 is very similar to interface 700, the difference being that in this case, control 902 has selected the RMT option. In consequence, the timing requirements indicated by control 904 indicate times at which the packet must be made available (e.g. sent from) the source.

FIG. 10 illustrates an interface 1000 for acknowledging packet transport protocols managed by the receiver, according to some embodiments. In this case, interface 1000 may be generated in response to a packet request from interface 900 where RMT was selected as the packet transport protocol. Interface 1000 is very similar to interface 800, the difference being that indicator 1006 indicates that RMT was selected, and indicator 1008 displays timing requirements for when the packet must be made available at the source.

The interface is illustrated in FIGS. 7-10 may be considered user interfaces through which information may be entered/acknowledged manually by users. In other embodiments, the information represented by the interfaces may also be considered to be provided/consumed by Web services that automatically analyze the information provided in the interfaces and make necessary determinations and/or acknowledgments. For example, instead of displaying interface 1000 of FIG. 10 to a user, the information used to populate data structure 1000 may instead be provided to a web service that reads data fields used to populate indicator 1006 and indicator 1008 and provides automatic electronic acknowledgment through a corresponding web interface at the receiving system.

Figure 11:
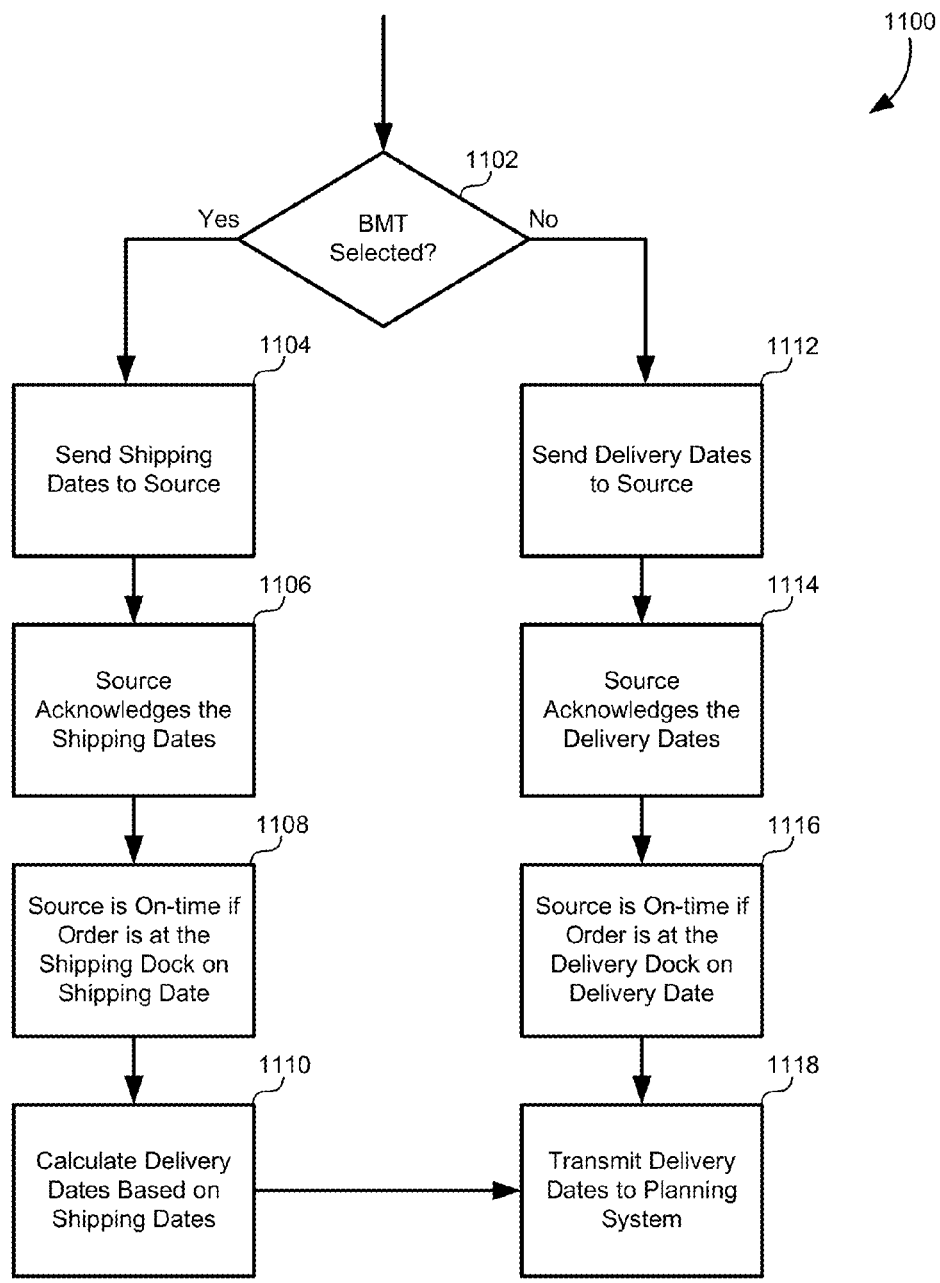
FIG. 11 illustrates a flowchart of a method for computing timing requirements and interfacing with an analytics engine, according to some embodiments.

FIG. 11 illustrates a flowchart 1100 of a method for computing timing requirements and interfacing with an analytics engine, according to some embodiments. This method can be used after the protocol is selected to translate timing requirements and interface with a planning system and/or an analytics process. First, a determination can be made as to whether RMT is selected and authorized (1102). If a protocol is selected that uses RMT where packet transport will be managed by the receiver, then the need-by time provided in the packet request can be translated into a shipping date at which the packet needs to be available at the source (1104). This translation can be accomplished by estimating known packet latency from previous packet transports (e.g. estimated shipping times) and subtracting those from the need-by time. As described above, the source can acknowledge the timing requirements (1106). The timing requirement can also be transmitted to the analytics process, and the source can be considered "on time" if the packet arrives at or before the time indicated by the timing requirement (1108). In order to interface with a planning system, a date by which the packet should arrive at the receiver can be calculated (1110) and transmitted to the planning system (1118). This allows the planning system to schedule future packet requests based on when the package will arrive at the receiver.

Alternatively, it RMT is not selected, then the receiving system can send, to the source system, timing requirements that indicate when the packet should arrive at the receiver (1112). As described above, the source can acknowledge these timing requirements (1114). Subsequently, the source will be considered "on time" if the packet arrives at the receiver at or before the time indicated by the timing requirement (e.g. when the packet arrives at the delivery dock of the receiver) (1116). The timing requirement representing the delivery date can be transmitted to the planning system accordingly (1118).

FIG. 12A illustrates, a sample document 1200a that may be transmitted to the source when packet transport is managed by the source, according to some embodiments. As described above, in addition to providing an electronic packet request, some receiving systems may also generate formal documentation in the form of a Portable Document Format (PDF) document or other hard copy documents that indicate the terms of the packet transport agreement. One object of these formal documents is to unambiguously spell out the terms of the packet transport agreement to form a legally binding relationship between the receiver and source such that the timing requirements and transport responsibilities are clearly spelled out and not subject to ambiguities. In this simplified example, the sample document 1200a includes promised and requested dates that are modified by indicator 1202a to specify that the timing requirements specifically indicate when the packet must be delivered to the receiver. Similarly, FIG. 12B illustrates a sample document 1200b that may be transmitted to the source when the packet transport is managed by the receiver, according to some embodiments. In sample document 1200b, the timing requirements are modified by indicator 1202b which specifies that the packet must be made available at the receiver for RMT by the time indicated by the timing requirements.

FIG. 13 illustrates an interface 1300 for scoring sources based on meeting timing requirements for packet transport, according to some embodiments. As described above, a score can be calculated for each packet source based on how well that source adheres to the timing requirements transmitted with the packet requests. In this embodiment, five or more metrics may be combined in order to generate a source score. First, the percentage of packets accepted by the receiver may be considered. Second, the percentage of packets received at or before times indicated by the timing requirements may be considered. Third, a percentage of packets received after times indicated by the timing requirements may be considered. Fourth, a percentage of packets received before times indicated by the timing requirements may be considered. Fifth, a total number of packets received may be considered. In some embodiments, each of these percentages may be multiplied together in order to generate a final score that is represented graphically by, for example, a "five-star system" as illustrated by interface 1300. As described above, the score for each source can be used to determine automatically circumstances under which that source should be used in the future for packet requests.

One particular area of application for the embodiment described herein may deal with purchase orders and shipping logistics. A Purchase Order (PO) is a commercial document and a first official offer issued by a receiver (buyer) to a source (seller). It may indicate types, quantities, and agreed-upon prices for products or services. A Purchase Order document may be organized into Headers, Lines, Schedules and Distributions. The header of the document may contain information about receiver business units requiring the goods, the supplier and site information, communication methods and carriers used to deliver the goods. Lines contain details of goods being ordered. A schedule typically specifies the quantity, ship-to location and dates the supplier needs to deliver goods.

Previously, this document included a requirement to mention the method of delivering the packets (shipped products). The purchase order document only included a provision to mention a packet carrier (e.g. FedEx, UPS, etc.). Mentioning only a package carrier can be insufficient in many cases, as the same carrier can support multiple modes of transport. This may lead the supplier to ship goods using a transport protocol that can be costly in terms of time delays where the transport mode requires a longer lead time, or in terms of unplanned expenses where the transport mode is later associated with higher freight cost. Furthermore, typically only a single carrier was applicable to all order schedules. The ability to indicate an expedited shipping method was not for a specific schedule without expediting the whole order.

The embodiments described herein solves these problems mentioned above. Instead of specifying only a carrier in purchase order, these embodiments include a method for indicating a mode of transportation, and a service level as well. The three combined together are indicated in the field 'Shipping Method' of the user interface figures described above. Therefore, a shipping method may be defined as a combination of a carrier selection, a mode of transport, and/or a service level. When each of these components are specified, the source will have a clear idea about the terms required. It will also be easier for the receiver to communicate this information. Instead of requiring additional unstructured shipping instruction methods like notes and attachments, the receiver can, for example, indicate that the carrier is UPS, the mode of transport is "ground" and the service level is 5 days.

Other common problems may involve ambiguities surrounding FOB, which is an acronym for "Freight (or Free) On Board." FOB on a purchase order indicates the point of sale of the goods being ordered. FOB Origin/Shipping point typically means that the sale occurred at the shipping point—at the source's shipping dock. FOB Destination indicates that the sale will occur when it arrives at the destination—at the receiver's receiving dock. It is typical of the receiver or source to communicate requested and promised dates with regards to delivery in the context of the FOB point. If a sale occurs at the shipping point (source's shipping dock), delivery terms on purchase order should indicate (1) a requested ship date from the receiver, and (2) a promised ship date by the source (which can be the same as the requested ship date). If the sale doesn't occur until the goods reach the destination (terms are FOB Destination), then the source is responsible for transporting the packet until it reaches the receiver's unloading dock. In this scenario, delivery terms on the purchase order should indicate (1) a requested delivery date from the receiver, and (2) a promised delivery/arrival date.

Prior to this disclosure, electronic purchase orders supported only two delivery date related terms: the "need-by date" and the "promised date." Logistics and planning applications assume these dates to be the date of arrival in the receiving dock, which works well for FOB Destination arrangements but does not work well for FOB Origin when both the receiver and the source would ideally like to work based on the date that the packet needs to be shipped from the source. This also creates another problem for new sources that may not be familiar with the receiver's operations. They may incorrectly assume that the need-by date is the requested ship date when the transport protocol is for the FOB Origin arrangement. They may promise against this need-by date and ship the packet based on this date, which is supposed to be for delivery, not shipping.

Prior to this disclosure, performance tracked using receipt dates and promised dates could be quite inaccurate in FOB Origin scenarios as stated in the problem above. In some embodiments, when the purchase order is for FOB Origin, the date that the supplier has promised is the requested ship date, not the requested delivery date. Some embodiments hide the requested delivery date when the receiver-managed transport flag is checked to prevent any confusion. This ensures that on-time performance is based on promised ship dates and not on delivery or receipt dates.

With these new dates, receivers and sources can clearly communicate when the packet should depart from the shipping point. Also to avoid confusion, the existing need-by-date and promised date fields can be re-labeled as requested delivery date and promised delivery date respectively. The purchase order may include a new flag "receiver-managed transport" to indicate whether it is an FOB Origin/Shipping arrangement. If the flag is checked, it may indicate that the FOB terms are for Origin. Similarly, when the flag is unchecked, the requested ship date can be hidden, and the document can show the requested delivery date.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
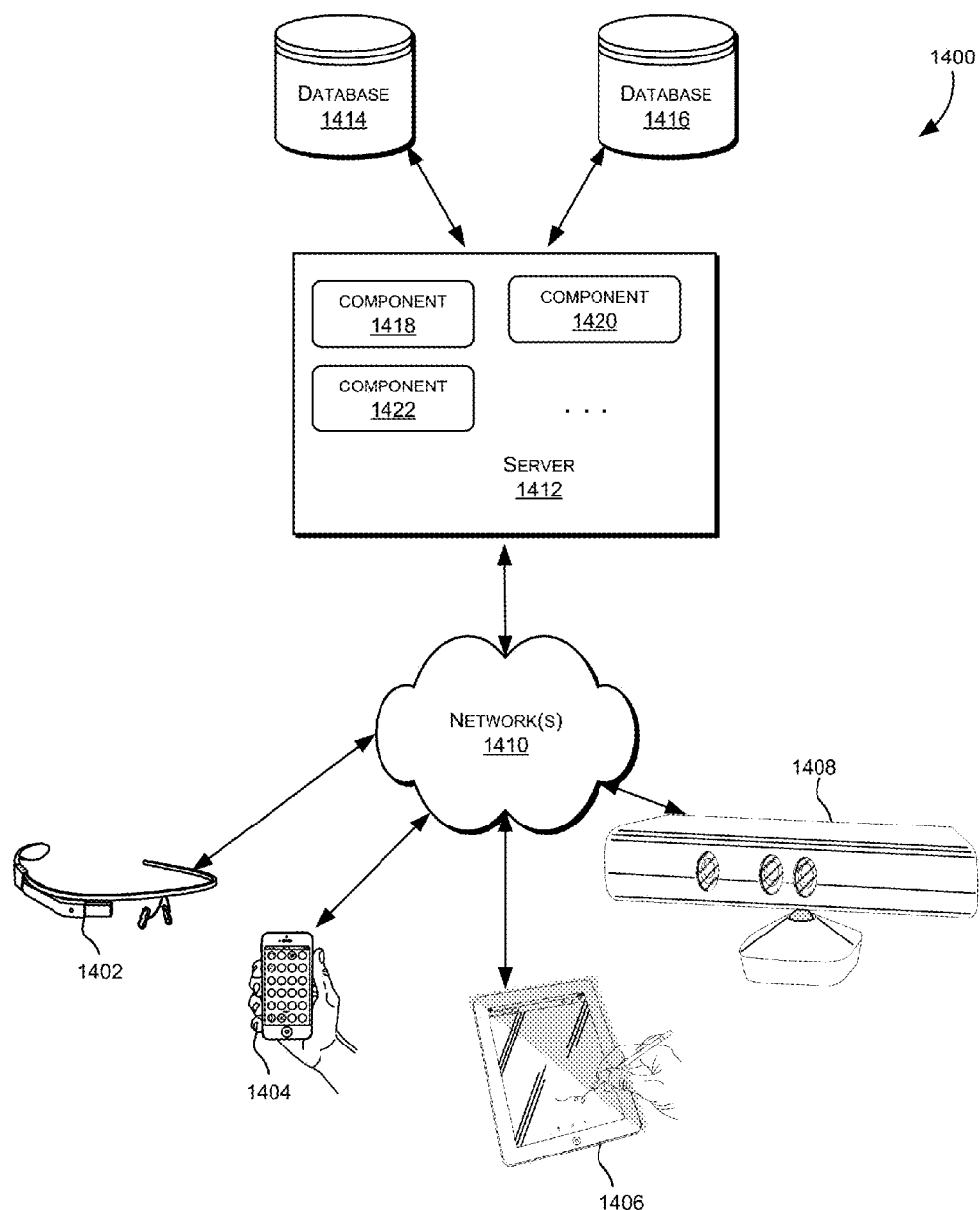
FIG. 14 illustrates a simplified block diagram of a distributed system for implementing some of the embodiments.

FIG. 14 depicts a simplified diagram of a distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
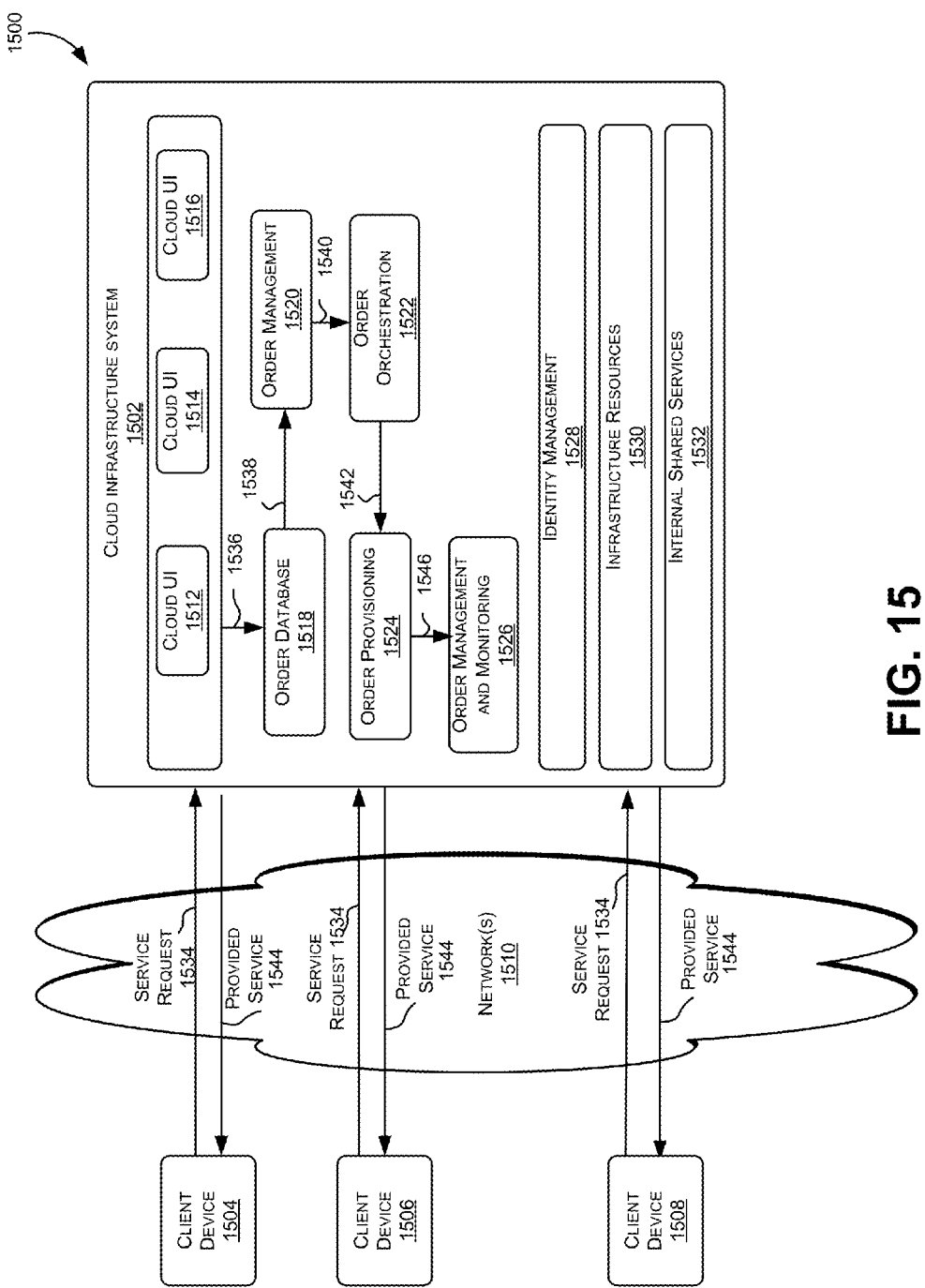
FIG. 15 illustrates a simplified block diagram of components of a system environment by which services provided by the components of an embodiment system may be offered as cloud services.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols, including those described above for network(s) 1410.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order.

Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
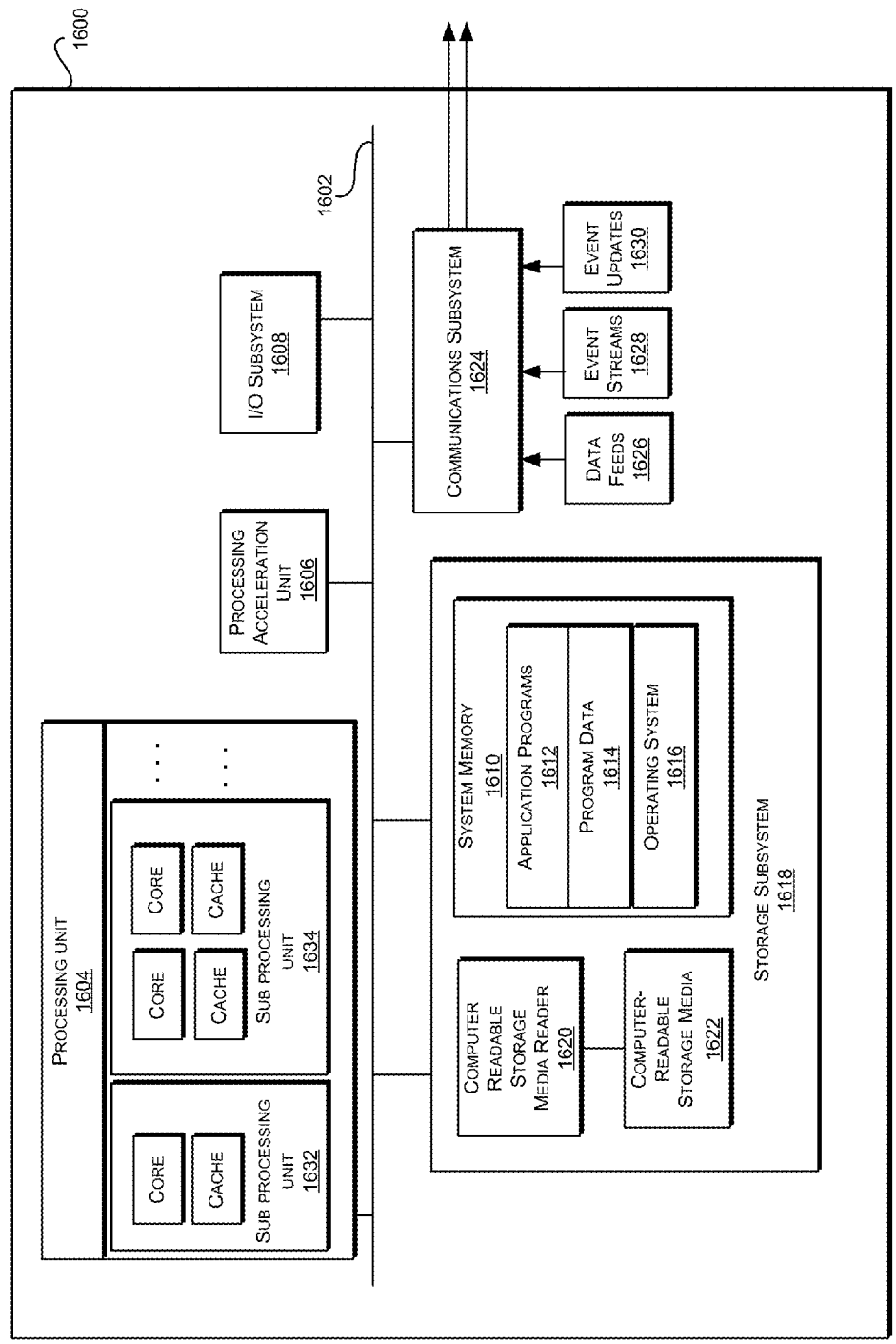
FIG. 16 illustrates an exemplary computer system, in which various embodiments may be implemented.

FIG. 16 illustrates an exemplary computer system 1600, in which various embodiments of the present invention may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present invention.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of implementing a packet transport protocol for packet transport between a source and a receiver, the method comprising:
receiving, at a receiving system, input from a source system, the input comprising data fields indicating whether the source system will allow packet transport to be governed by protocols in which the packet transport is handled by the receiver;

receiving, at the receiving system, input indicating that a packet from the source is required by the receiver, the input comprising:
  a first timing requirement indicating a time by which the packet is required at the receiver; and
  a selection of a protocol, the protocol being selected from a group of protocols comprising:
    a first protocol, in which packet transport is handled by the receiver; and
    a second protocol, in which packet transport is handled by the source;
determining, at the receiving system, whether the source will allow the protocol based on the data fields from the source system;
transmitting, from the receiving system to the source system, a request for the packet, the request comprising a second timing requirement for the source, wherein:
  if the selection is of the first protocol, then the second timing requirement indicates the time at which the packet is to be made available at the source such that the packet arrives at the receiver at or before the time indicated by the first timing requirement; and
  if the selection is of the second protocol, then the second timing requirement is the same as the first timing requirement such that the packet arrives at the receiver at or before the time indicated by first timing requirement.

2. The method of claim 1, wherein the request for the packet transmitted from the receiving system to the source system further comprises:
  an indication of the first protocol if the first protocol is the protocol, and if it is determined that the source will allow the second protocol based on the data fields; and
  an indication of the second protocol if the second protocol is selected, or if it is determined that the source will not allow the second protocol based on the data fields.

3. The method of claim 1, further comprising:
  sending, from the receiving system to an analytics process, the second timing requirement;
  receiving, at the analytics process, a time when the packet is received by the receiver; and
  scoring, at the analytics process, the source relative to other sources based on a comparison between the second timing requirement and the time when the packet is received by the receiver.

4. The method of claim 1, wherein the web interface comprises a web service.

5. The method of claim 1, further comprising:
  locating a data structure for the source if the data structure already exists, or generating the data structure for the source if the data structure does not already exist, wherein the data structure stores an organizational hierarchy of the source;
  storing the data fields received from the source in the data structure; and
  accessing the data structure when determining whether the source will allow the protocol based on the data fields from the source system.

6. The method of claim 5, wherein determining whether the source will allow the protocol based on the data fields from the source system comprises:
  accessing a plurality of locations from which the source can provide the packet;
  selecting a location from the plurality of locations;
  accessing a data field from the data fields, wherein the data field is associated with the location; and
  determining whether the location will allow the protocol based on the data field.

7. The method of claim 1, wherein a difference between the first timing requirement and the second timing requirement represents a packet transport time under the first protocol.

8. A non-transitory, computer-readable medium comprising instructions which, when executed by one or more processors, cause the one or more processors to perform operations comprising:
  receiving, through a web interface at a receiving system, input from a source system, the input comprising data fields indicating if the source system will allow packet transport to be governed by protocols wherein the packet transport is handled by a receiver;
  receiving, at the receiving system, input indicating that a packet from a source is required by the receiver, the input comprising:
    a first timing requirement indicating a time when the packet is required at the receiver; and
    a selection of a protocol, the protocol being selected from a group of protocols comprising:
      a first protocol, wherein packet transport is handled by the receiver; and
      a second protocol wherein packet transport is handled by the source;
  determining, at the receiving system, whether the source will allow the protocol based on the data fields from the source system;
  transmitting, from the receiving system to the source system, a request for the packet, the request comprising a second timing requirement for the source, wherein:
    if the first protocol is selected, the second timing requirement indicates the time at which the packet should be made available at the source such that the packet arrives at the receiver at or before the first timing requirement; and
    if the second protocol is selected, the second timing requirement is the same as the first timing requirement such that the packet arrives at the receiver at or before the first timing requirement.

9. The non-transitory computer-readable medium of claim 8, wherein the request for the packet transmitted from the receiving system to the source system further comprises:
  an indication of the first protocol if the first protocol is the protocol, and if it is determined that the source will allow the second protocol based on the data fields; and
  an indication of the second protocol if the second protocol is selected, or if it is determined that the source will not allow the second protocol based on the data fields.

10. The non-transitory computer-readable medium of claim 8, comprising additional instructions which, when executed by the one or more processors, causes the one or more processors to perform operations further comprising:
  sending, from the receiving system to an analytics process, the second timing requirement;
  receiving, at the analytics process, a time when the packet is received by the receiver; and
  scoring, at the analytics process, the source relative to other sources based on a comparison between the second timing requirement and the time when the packet is received by the receiver.

11. The non-transitory computer-readable medium of claim 8, wherein the web interface comprises a web service.

12. The non-transitory computer-readable medium of claim 8, comprising additional instructions which, when executed by the one or more processors, causes the one or more processors to perform operations further comprising:
locating a data structure for the source if the data structure already exists, or generating the data structure for the source if the data structure does not already exist, wherein the data structure stores an organizational hierarchy of the source;
storing the data fields received from the source in the data structure; and
accessing the data structure when determining whether the source will allow the protocol based on the data fields from the source system.

13. The non-transitory computer-readable medium of claim 12, wherein determining whether the source will allow the protocol based on the data fields from the source system comprises:
accessing a plurality of locations from which the source can provide the packet;
selecting a location from the plurality of locations;
accessing a data field from the data fields, wherein the data field is associated with the location; and
determining whether the location will allow the protocol based on the data field.

14. The non-transitory computer-readable medium of claim 8, wherein a difference between the first timing requirement and the second timing requirement represents a packet transport time under the first protocol.

15. A system comprising:
one or more processors; and
one or more memory devices comprising instructions which, when executed by the one or more processors, cause the one or more processors to perform operations comprising:
receiving, through a web interface at a receiving system, input from a source system, the input comprising data fields indicating if the source system will allow packet transport to be governed by protocols wherein the packet transport is handled by a receiver;
receiving, at the receiving system, input indicating that a packet from a source is required by the receiver, the input comprising:
a first timing requirement indicating a time when the packet is required at the receiver; and
a selection of a protocol, the protocol being selected from a group of protocols comprising:
a first protocol, wherein packet transport is handled by the receiver; and
a second protocol wherein packet transport is handled by the source;
determining, at the receiving system, whether the source will allow the protocol based on the data fields from the source system;
transmitting, from the receiving system to the source system, a request for the packet, the request comprising a second timing requirement for the source, wherein:
if the first protocol is selected, the second timing requirement indicates the time at which the packet should be made available at the source such that the packet arrives at the receiver at or before the first timing requirement; and
if the second protocol is selected, the second timing requirement is the same as the first timing requirement such that the packet arrives at the receiver at or before the first timing requirement.

16. The system of claim 15, wherein the request for the packet transmitted from the receiving system to the source system further comprises:
an indication of the first protocol if the first protocol is the protocol, and if it is determined that the source will allow the second protocol based on the data fields; and
an indication of the second protocol if the second protocol is selected, or if it is determined that the source will not allow the second protocol based on the data fields.

17. The system of claim 15, wherein the one or more memory devices comprise additional instructions which, when executed by the one or more processors, causes the one or more processors to perform operations further comprising:
sending, from the receiving system to an analytics process, the second timing requirement;
receiving, at the analytics process, a time when the packet is received by the receiver; and
scoring, at the analytics process, the source relative to other sources based on a comparison between the second timing requirement and the time when the packet is received by the receiver.

18. The system of claim 15, wherein the web interface comprises a web service.

19. The system of claim 15, wherein the one or more memory devices comprise additional instructions which, when executed by the one or more processors, causes the one or more processors to perform operations further comprising:
locating a data structure for the source if the data structure already exists, or generating the data structure for the source if the data structure does not already exist, wherein the data structure stores an organizational hierarchy of the source;
storing the data fields received from the source in the data structure; and
accessing the data structure when determining whether the source will allow the protocol based on the data fields from the source system.

20. The system of claim 19, wherein determining whether the source will allow the protocol based on the data fields from the source system comprises:
accessing a plurality of locations from which the source can provide the packet;
selecting a location from the plurality of locations;
accessing a data field from the data fields, wherein the data field is associated with the location; and
determining whether the location will allow the protocol based on the data field.

* * * * *

UNITED STATES PATENT AND TRADEMARK OFFICE
CERTIFICATE OF CORRECTION

PATENT NO. : 9,628,591 B2  
APPLICATION NO. : 14/730055  
DATED : April 18, 2017  
INVENTOR(S) : Dharmavaram et al.

Page 1 of 1

It is certified that error appears in the above-identified patent and that said Letters Patent is hereby corrected as shown below:

In the Specification

In Column 7, Line 59, delete "may may" and insert -- may --, therefor.

In Column 16, Line 24, delete "UNIXO" and insert -- UNIX® --, therefor.

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*